Patented Sept. 18, 1951

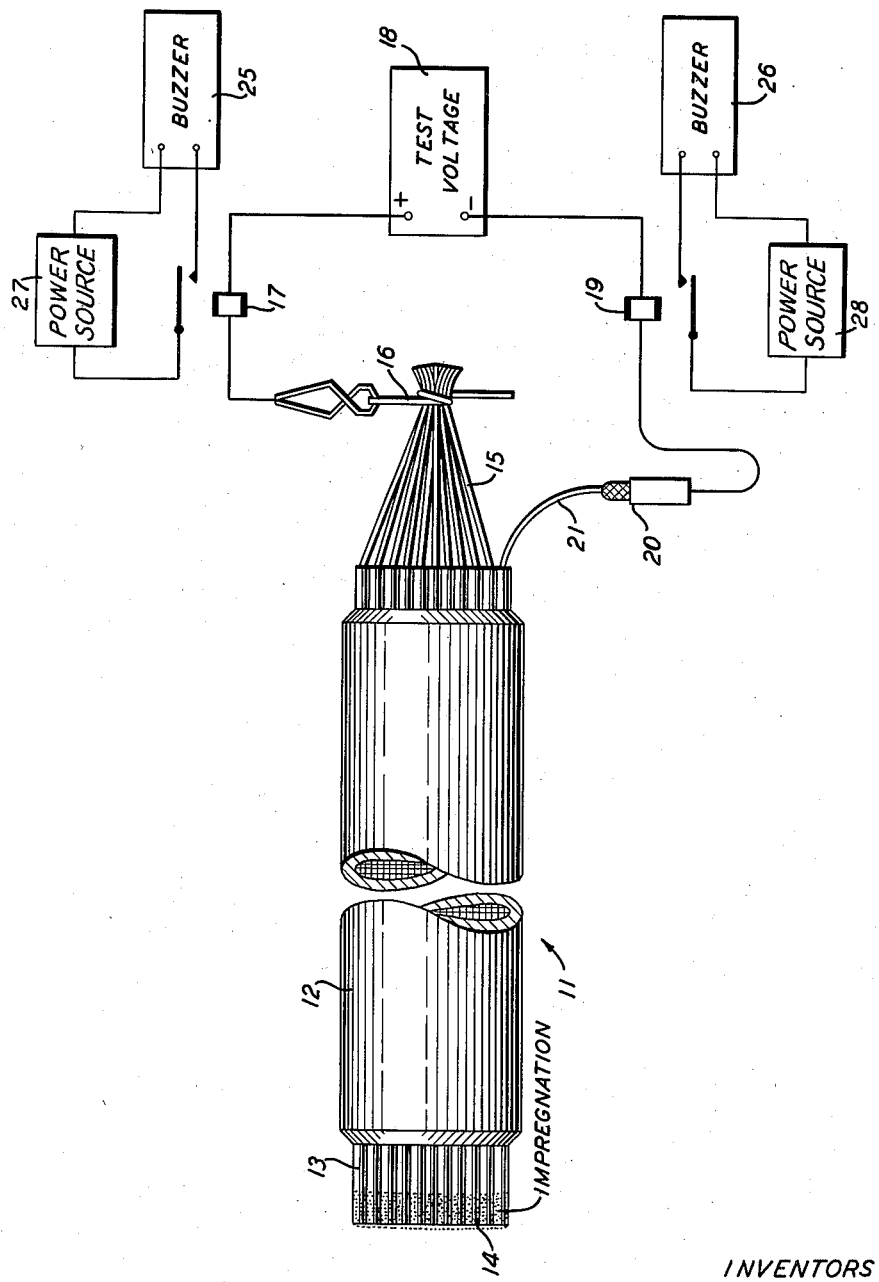

2,568,161

UNITED STATES PATENT OFFICE 2,568,161

DEVICE FOR TESTING CABLES

Albert J. Meyerhoff, Union, and John H. Sulzer, Union Beach, N. J., assignors to Western Electric Company, Incorporated, New York, N. Y., a corporation of New York Application February 4, 1949, Serial No. 74,568

7 Claims. (Cl. 175—183)

This invention relates to a device for testing cables, and it is an object of this invention to provide a testing method and apparatus which is simple, reliable, and fast in operation.

The method generally used in testing the individual conductors in a cable for short and open circuits involves handling each conductor twice. The insulation is removed from the conductors at one end of the cable and the bare ends are bonded together with a conductive piece of material. This bond is connected to an alarm box which contains both an alarm and a source of electrical potential which causes the alarm to sound when a circuit is completed across the voltage source. The connection to the bond forms one side of the signal circuit and the other side is a test pick and cord.

In testing for short circuits, the test pick is used to grip the bare end of a given conductor and pull it out of the common bond. When the test pick first grips the conductor, it causes a short circuit condition, and the alarm sounds. As the conductor is removed from the bond, the alarm ceases if the conductor is free from shorts but continues if there is a short circuit between the tested conductor and any other conductor of the cable.

In testing the conductors for open circuits, it is necessary in this conventional type of test for the operator to go to the opposite end of the test cable and pull each conductor out for test by means of the test pick. If a given conductor is continuous, a circuit is completed from the alarm box through the test pick, through the conductor, and back to the alarm box through the bond causing the alarm to sound. If there is an open in the conductor, no circuit is completed and the alarm is silent.

The above method of testing has the obvious disadvantage of requiring two manipulations per conductor, since opens and short circuits are tested at opposite ends of the cable. This causes an increase in the time required for testing cables which greatly adds to the cost of the testing operation. In addition, the tester must place all of the conductors within the bond again, after the short circuit tests have been completed before he can go to the opposite end to proceed with the test for continuity.

Applicants have devised a method for testing the individual conductors of a cable which tests for both shorts and open circuits with the same manipulation. This is accomplished by connecting all of the conductors at one end of the cable together to form a plurality of conductive loops, each having a resistance greater than the combined resistance of the two individual conductors forming a part of each loop, but less than the loop insulation resistance. The wires at the other end of the cable are bonded together, and the bond is connected to a test circuit including a source of voltage, a test pick, and indicating means. As each conductor is pulled away from the bond with the test pick, varying resistances of the test circuit, which are determined by the condition of the conductor under test, cause the relays to actuate signals to indicate the condition of the conductor.

Other advantages and features will be apparent from the following detailed description taken in connection with the attached drawing in which:

Fig. 1 is a pictorial diagram of the invention.

With reference to Fig. 1, the cable to be tested is designated generally as 11. The cable sheath 12 is removed from both ends of the cable as shown. One end 13 of the cable which in the test is the far end, is cut off square and impregnated with a semi-conducting liquid solution, such as, for example, a mixture of borax and glycerin. This impregnation 14 has the effect of providing a conductive path between the end of each conductor and the end of every other conductor in the cable, so that any two conductors will form a loop. The solution used for impregnation is chosen for its properties as a semi-conductor, so that the resistance of the effective loop which is formed will be appreciably higher than the resistance of the loop which would be formed if two of the individual conductors were to have their bare ends joined at the impregnated end of the cable, which would be approximately the condition present if the cable were to have a short circuit between two of its conductors occurring near this far end.

The conductors at end 15 of the cable, which during the actual test would be the near end, are stripped of their insulation and are all joined together by a bond 16, such as, for example, a loop of copper wire, which is kept taut to keep the conductors at this end pressed closely together. This bond is connected through relay 17 to one side of a suitable source of test power 18. The other side of the test voltage is connected through relay 19 to a test pick 20 which is used to pick the individual conductors such as conductor 21 out of the bond in order to test it for opens and short circuits.

When operated, relay 17 actuates a buzzer 25 and relay 19 actuates a buzzer 26, the buzzers being supplied with voltage from sources 27 and 28, having the contacts of their associated relay in series with their respective voltage sources. The buzzers are selected to have separate distinctive tones.

To illustrate the function of the relays, assume that the resistance of a loop consisting of two conductors of the test cable joined electrically at the far end of the cable is slightly less than 1000 ohms, which is often the case. The extent to which the cable end is impregnated in the semiconductive solution is governed so that the loop resistance of the conductive path formed through it by any two conductors will be within the range of from 3000 to 30,000 ohms. To enable the relays to be responsive to changes in the resistance of the various loops which are successively tested, relay 17 is set to operate at currents corresponding to a loop resistance of 30,000 ohms and below, while relay 19 operates only on currents corresponding to a loop resistance of 1000 ohms or less.

In the operation of the test, the tester will use the test pick to pick the first conductor from out of the bond. As the test pick touches the bare ends of the conductors at the near end of the cable, it causes a short circuit condition through the testing circuit, as the test pick has a direct low resistance connection to the bond side of the circuit. Since the resistance of this path is less than 1000 ohms, both relays will operate, and actuate their respective buzzers. A tone will be heard which will be a combination of the distinctive tones of the individual buzzers. As the particular conductor to be tested is withdrawn from and becomes separate from the bond, this short circuit is removed, and if the conductor is good the test circuit will now include the loop consisting of the wire being tested, the impregnating solution, and the return through the conductors still bonded. As the resistance of the test circuit is now between 3000 and 30,000 ohms, relay 17 will continue operating and actuating its buzzer 25, but relay 19 will cease operating, thus silencing its buzzer 26. The change in tone as buzzer 26 drops out will tell the operator that the tested conductor is a good one.

If the wire under test is shorted across one of the others, this short circuit prevents the impregnating solution with its added resistance from becoming a part of the test circuit, and since the circuit resistance is less than 1000 ohms, both relays and buzzers will continue to operate after the test pick has removed the conductor to be tested from the bond. The fact that there has been no change in tone will indicate to the operator that a short circuit is present, and the conductor is tagged accordingly.

Should the conductor contain an open circuit, this will obviously increase the resistance of the test path far beyond 30,000 ohms. Since neither relay will operate beyond a resistance of 30,000 ohms, both buzzers will be silenced, which condition will inform the tester of the presence of the open circuit.

The remaining wires are tested in a similar manner. As each conductor is pulled from the bond by the test pick, the fact of a change in tone, no change in tone, or a silencing of the buzzers tells the operator immediately if the conductor is good, has a short, or has an open, respectively.

It will thus be obvious that the solution of borax and glycerin, when applied to one of a cable to be tested provides a method of resistance differentiation among the several possible conditions of a conductor. The use of this solution in conjunction with resistance sensitive relays and appropriate signals makes it possible to conduct the test entirely from one end of the cable. In addition to the obvious saving in time and money, the fact that the operator does not have to go to the opposite end of the cable to complete the test cuts down appreciably the number of manipulations required by the tester, and with this reduction goes a corresponding decrease in the errors arising from the human element involved.

In considering various substances for use as the resistance differentiating element, it was found that using substances in the form of a solution worked better as a practical matter than using substances in the form of a paste or a conducting paint, since the latter method required that the cable end to which it was to be applied be cut off very carefully to insure having the paste or paint establish electrical paths with all of the conductors. By impregnating this end with a solution, no special method of cutting off the end is required, thus preventing this step of the operation from taking more than a normal time.

Several substances were under consideration as elements of the solution to be used. As a result of several tests and experiments, it was found that the use of five per cent of borax by weight dissolved in a solution of commercial glycerin gave the best operating characteristics of all of the components which were tried. The borax in the solution provides stable conductivity with small change in resistance due to changes in current, while the glycerin serves as an anti-drying agent to insure having the impregnation remain effective as a conductor for periods long exceeding the time normally required for cable testing. The resistance which the solution adds to the conductive paths of which it becomes a part varies inversely with the amount of the cable end which is impregnated in the solution, and the desired range of resistance increase for a given testing operation, may be easily determined by experiment. It is entirely possible that other equally suitably combinations of elements may be found by those who may practice the invention.

It is well known that the conventional method of testing described at the beginning of the application has a distinct disadvantage in that where a conductor contains certain defects in combination such as an open and a short, with the open being closer to the bond end, the test will not find either defect. This is because in testing for the short circuit with the test pick at the bond end of the cable, the open in the wire, being closer to the bond, will prevent the signal for a short from being given; and likewise, when the test pick is taken to the end of the cable opposite from the bond to make the continuity test, the short will keep the part of the wire containing the open from becoming a part of the test circuit. The tester would therefore pass the wire as being free from defects.

In such a case, a test circuit utilizing applicants' invention will not find the short circuit, but it will detect the open circuit as the open will cause the test circuit to have a resistance in excess of 30,000 ohms, and the open would be indicated by the resultant silencing of the buzzers. Since a defective wire is universally retested after the fault has been removed, the short circuit would be detected on the second test. This new method of testing has the added advantage, therefore, of not passing a conductor with a plurality of faults until each defect has been located and corrected.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In the method of testing cables having a plurality of insulated conductors for conductor continuity and short circuits between pairs of the conductors in which test potential is applied between adjacent ends of the pairs of conductors, the step which comprises applying to the other adjacent ends of the conductors a material of such resistance as to establish in the conductive loops thus formed a plurality of electrical paths each having a resistance greater than the combined resistance of the two individual conductors forming a part of each path, but less than their insulation resistance.

2. In the method of testing a pair of insulated conductors for conductor continuity and short circuits in which test potential is applied between two ends of the pair of conductors, the step which comprises placing the other two ends in adjacent relation, and applying to said adjacent ends a material of such resistance as to establish in the conductive loop thus formed an electrical path having a resistance greater than the combined resistance of the two individual conductors but less than their insulation resistance.

3. The method of establishing a resistance differential in a circuit which comprises placing insulated ends of a pair of conductors adjacent to each other, and applying to said ends a semi-conductive material of such resistance as to establish in the conductive loop thus formed an electrical path having a resistance greater than the combined resistance of the two individual conductors, but less than their insulation resistance.

4. The method of establishing a resistance differential in a circuit which comprises placing insulated ends of a plurality of conductors adjacent to each other and applying to said ends a semi-conductive material of such resistance as to establish in the conductive loops thus formed a plurality of electrical paths each having a resistance greater than the combined resistance of the two individual conductors forming a part of each path, but less than their insulation resistance.

5. In apparatus for testing cables having a plurality of insulated conductors, the combination with means for electrically bonding the conductors together at one end of the cable, a test pick for withdrawing the conductors singly from the bond and a circuit including a source of potential connecting the bonding means to the test pick, of two indicator operating devices of different current sensitivities serially connected in the circuit, and means for establishing between the other end of each conductor and the other ends of the other conductors of the cable electrically conductive paths having predetermined resistances for causing selective operation of the devices according to the conditions of the conductors, said means comprising a semi-conductive material applied to the insulated conductors at the end opposite the bonded end.

6. In apparatus for testing cables having a plurality of insulated conductors, the combination with means for electrically bonding the conductors together at one end of the cable, a test pick for withdrawing the conductors singly from the bond and a circuit including a source of potential connecting the bonding means to the test pick, of two indicator operating devices of different current sensitivities serially connected in the circuit, and a semi-conductive material joining the other ends of the conductors together to form a plurality of conductive loops each having a resistance greater than the combined resistance of the two individual conductors forming a part of each loop, but less than their insulation resistance.

7. In apparatus for testing cables having a plurality of insulated conductors, the combination with means for electrically bonding the conductors together at one end of the cable, a test pick for withdrawing the conductors singly from the bond and a circuit including a source of potential connecting the bonding means to the test pick, of two indicators, two indicator operating devices of different current sensitivities serially connected in the circuit, and a semi-conductive material joining the other ends of the conductors together to form a plurality of conductive loops each having a resistance greater than the combined resistance of the two individual conductors forming a part of each loop, but less than their insulation resistance.

ALBERT J. MEYERHOFF.
JOHN H. SULZER.

REFERENCES CITED

The following references are of record in the file of this patent:

UNITED STATES PATENTS

| Number | Name | Date |
|---|---|---|
| 1,919,802 | Pfeiffer | July 25, 1933 |
| 1,977,703 | Swartwout | Oct. 23, 1934 |
| 2,331,418 | Nolde | Oct. 12, 1943 |
| 2,366,789 | Horham | Jan. 9, 1945 |